United States Patent [19]

Briden

[11] Patent Number: 5,088,683

[45] Date of Patent: Feb. 18, 1992

[54] BREAKAWAY POLE ASSEMBLY

[75] Inventor: C. Richard Briden, Bound Brook, N.J.

[73] Assignee: Cooper Industries, Inc., Houston, Tex.

[21] Appl. No.: 510,726

[22] Filed: Apr. 18, 1990

[51] Int. Cl.$^5$ .............................................. F16M 13/00
[52] U.S. Cl. ................................... 248/548; 52/98;
403/2; 248/900; 248/909
[58] Field of Search .............. 248/548, 549, 900, 909;
403/2; 52/98, 100

[56] References Cited

U.S. PATENT DOCUMENTS

| | | | |
|---|---|---|---|
| 3,521,413 | 7/1970 | Scott et al. | 248/548 X |
| 3,563,502 | 2/1971 | Dayson | 52/98 |
| 3,599,926 | 8/1971 | Takahashi | 248/549 |
| 3,630,474 | 12/1971 | Minor | 52/98 |
| 4,007,564 | 2/1977 | Chisholm | 52/98 |
| 4,490,062 | 12/1984 | Chisholm | 403/2 |
| 4,674,907 | 6/1987 | Shewchuk | 52/98 X |
| 4,813,199 | 3/1989 | Lewis, Jr. | 403/2 |

Primary Examiner—David L. Talbott
Attorney, Agent, or Firm—David A. Rose

[57] ABSTRACT

The breakaway assembly includes a cast aluminum base having a collar for supporting a wrought aluminum standard and a base flange for securing the breakaway assembly to a plurality of anchor bolts projecting from a concrete foundation. The base flange includes a plurality of apertures for receiving the anchor bolts. Grooves are provided in the base flange adjacent the anchor bolt apertures. Upon impact, the standard creases and bends causing the heel of the base flange to lift. This lifting motion shears the base flange at the grooves to permit the base to lift away from the anchor bolts.

14 Claims, 3 Drawing Sheets

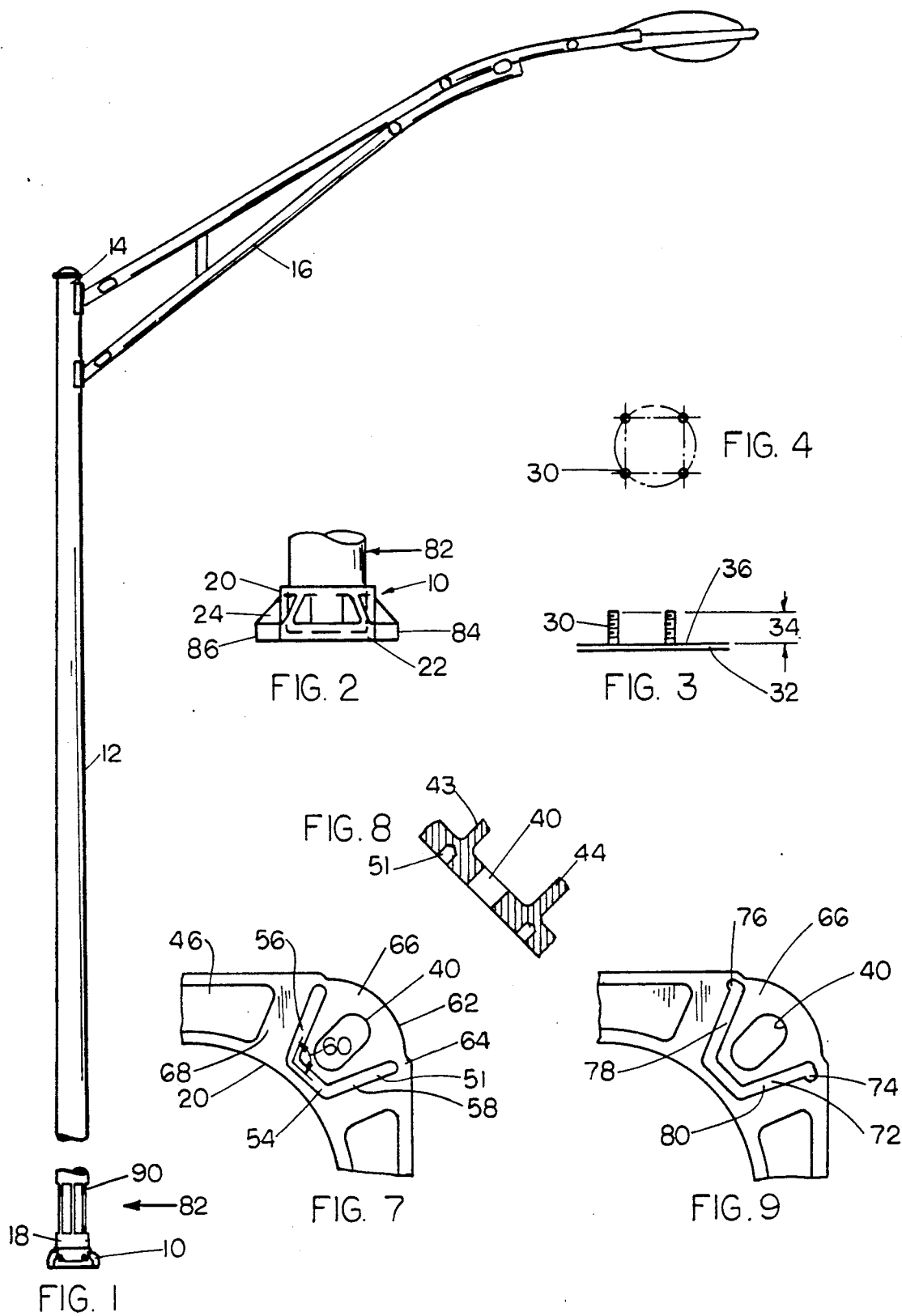

BREAKAWAY POLE ASSEMBLY

BACKGROUND OF THE INVENTION

This invention relates to standards for lights and more particularly to breakaway assemblies for light standards.

Breakaway assemblies are used for the support of standards for lights, signs, parking meters and the like. Such breakaway assemblies are designed to readily fail when the supported structure is subjected to lateral impact such as may be applied by a colliding automobile. At the same time, the breakaway assembly must have sufficient tensile and compressive strength to withstand wind loads which are applied to the supported structure by the application of winds prevalent in a particular geographic area. Supported structures desirably must fail under impact force so as to substantially reduce the severity or eliminate injury to motorists who collide with a supported structure 10 during an accident. The breakaway assembly is designed to give way upon impact of the automobile so as not to apply a substantial deceleration force to the automobile and thus the driver or passengers.

In 1985, AASHTO formulated new regulations for breakaway standards to be installed on federal highways. These regulations, more particularly set out in Section 7 thereof, require that the pole structures give way when struck with less impacting mass than that previously required. This lower impacting mass requirement has been caused by the construction of lighter cars. These new regulations become effective July 1, 1990.

There are three common types of breakaway assemblies for standards. The slip base type includes two flanges gripped together such that when the standard is struck, the slip base or pole flange slides away from the base or base flange affixed to anchor bolts imbedded in the foundation for the standard. U.S. Pat. No. 4,007,564 discloses a breakaway coupling device employing a fracture mode of crack propagation; i.e., the coupling(s) rupture or split upon impact, releasing the pole to move away from the foundation. Another type of breakaway assembly is the transformer base. The transformer base type mounts the standard on a housing approximately 15" to 24" high. The housing is a cast box and is frangible. Upon impact, the frangible housing fractures and splinters. One advantage of this type of housing is that often the standard is not damaged and can be salvaged. The housing becomes a sacrificial assembly.

Although the manufacturers of the prior art breakaway assemblies are attempting to redesign the prior art assemblies to meet the new specifications. This task is more difficult due to higher stress requirements due to taller poles, yet must fracture or release under lower impact mass. For example, in the use of the slip base, the standard may bend and place the slip bolts in tension preventing the slip base from slipping off the base flange. To design a transformer base which is sufficiently frangible to meet the new specifications, the new design may have less ability to withstand wind loads, particularly in the range of 80 to 100 mph winds. This is particularly a problem in certain geographic areas where the wind loads are high and require sturdier standards. The coupling with a flanged base mounted on top is more expensive when compared to the present invention herein described.

SUMMARY OF THE INVENTION

The breakaway assembly of the present invention includes a cast aluminum base having a collar for supporting a wrought aluminum tubular pole. The base includes a base flange having a plurality of anchor bolt apertures. Angular gussets are provided adjacent each anchor bolt aperture to provide stiffening between the base flange and collar. U-shaped grooves are provided on the bottom side of the base flange around the anchor bolt apertures between the aperture and collar. Upon impact of the standard, the standard creases and bends causing the heel of the base flange to lift and causes shearing through the grooves to lift the base away from the anchor bolts. The combination of the U-shaped grooves, the creasing and collapsing dynamics of the tubular pole due to its diameter and wall thickness, at point of impact, result in the heel of the base with the pole lifting in a hinging action.

These and other objects of the present invention will become apparent from an inspection of the following detailed description of the invention and the appended claims.

BRIEF DESCRIPTION OF THE DRAWINGS

For a detailed description of the preferred embodiment of the invention, reference will now be made to the accompanying drawings wherein:

FIG. 1 is an elevation view of the breakaway assembly of the present invention showing a highway lighting standard mounted on a base;

FIG. 2 is an enlarged view of the base shown in FIG. 1;

FIG. 3 is an elevation view of the anchor bolts used to affix the base to the foundation for the lighting standard of FIG. 1;

FIG. 4 is a top view of the anchor bolts shown in FIG. 3;

FIG. 7 is a partial bottom view of one corner of the base shown in, FIGS. 5 and 6;

FIG. 8 is a partial elevation view of the corner of the base shown in FIG. 7;

FIG. 9 is an alternative embodiment of the groove in the corner of the base.

DESCRIPTION OF THE PREFERRED EMBODIMENT

Figure 5:
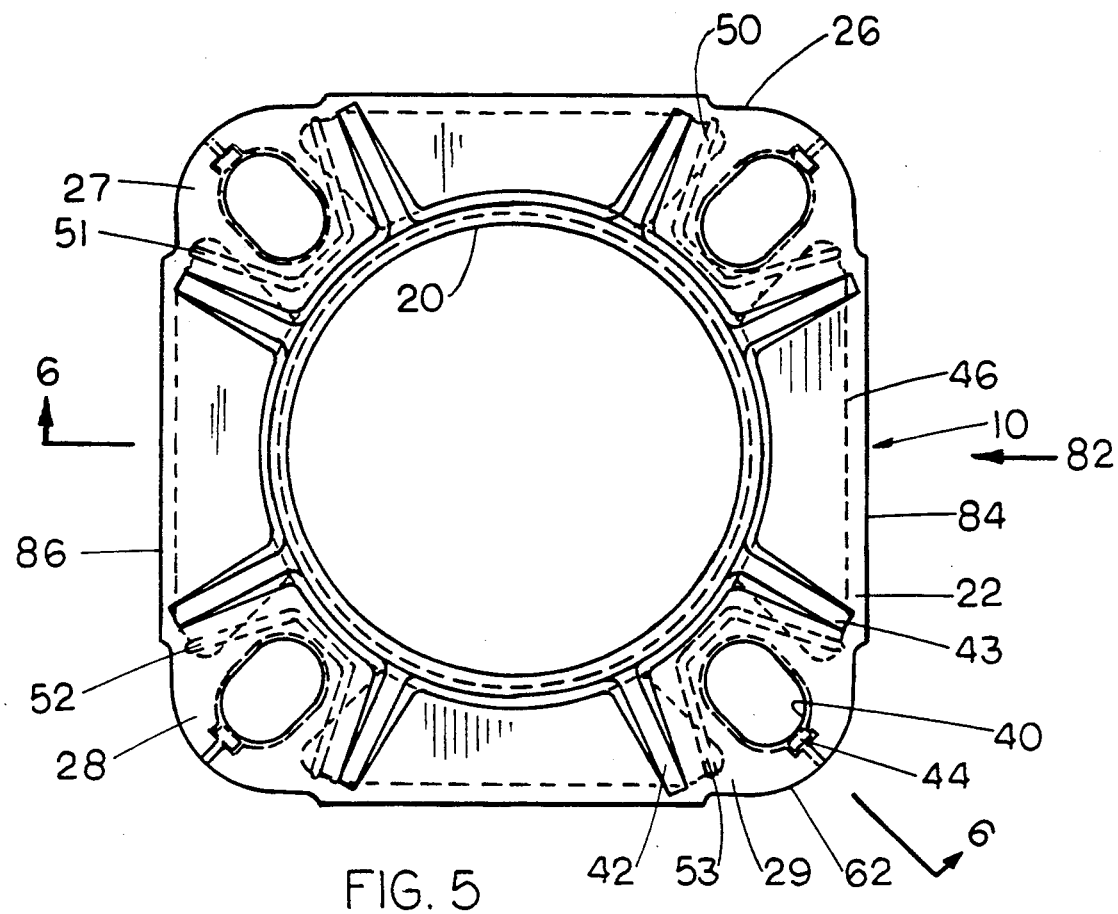
FIG. 5 is an enlarged top view of the base shown in FIG. 2.

Referring initially to FIG. 1, there is shown one application of the breakaway assembly of the present invention. A lighting structure includes a base 10 supporting a standard 12 which has attached to the top 14 thereof a cantilevered bracket 16 with a luminaire attached. The standard 12 is a generally cylindrical aluminum tube having a typical height of 20 or more feet. Standard 12 may be tapered and have a larger diameter extending from its bottom 18 to a smaller diameter at the top 14. Preferably, the aluminum standard 12 is made of wrought aluminum such as from 6063-T6 aluminum alloy. Wrought aluminum has certain "crush" characteristics or dynamics which are preferred for the operation of the present invention as is more particularly described hereinafter.

Referring now to FIG. 2, the integral cast base 10 includes a vertical collar 20 with a generally square horizontally projecting base flange 22. A pair of angular gussets 42, 43 are provided at each of the four corners 26, 27, 28, and 29 of the base flange 22 to provide additional support and stiffening for the base 10 between collar 20 and base flange 22.

Referring now to FIGS. 3 and 4, a plurality of anchor bolts 30 are embedded in a concrete foundation 32 and project upward therefrom. There are preferably four anchor bolts 30 circumferentially spaced in a bolt circle for receiving base 10 as hereinafter described. Anchor bolts 30 project a predetermined height 34 above the upper surface 36 of foundation 32. The predetermined height 34 is preferably 2¼". The length of the anchor bolts 30 projecting above the foundation 32 is critical to the present invention since the base flange 22 must eject and clear the anchor bolt 30 upon breakaway. By limiting the height of the anchor bolts 30 to 2¼" above the foundation 32, the anchor bolts 30 do not project so high above base flange 22 so as to snag flange 22 on the non-impact side 86 and prevent base flange 22 from lifting off foundation 32.

Figure 6:
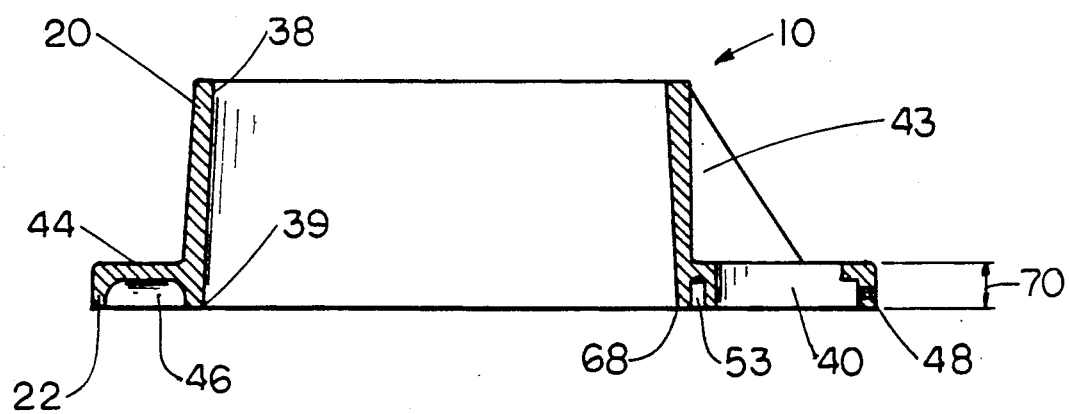
FIG. 6 is a section view taken at plane 6—6 of the base shown in FIG. 5.

Referring now to FIGS. 5 and 6, the collar 20, base flange 22, and angular gussets 42, 43 are cast in one integral piece of aluminum. The collar 20 has an internal diameter sized to receive the lower end 18 of tubular standard 12. Standard 12 is welded at its lower terminal end 16 at the top and bottom openings 38, 39 of collar 20 respectively.

The base flange 22 is generally square and includes four apertures 40 located in each of the corners 26, 27, 28, 29 of base flange 22 for receiving anchor bolts 30. It is preferred that apertures 40 have an oblong shape to permit easy insertion of anchor bolts 30 even though one of the anchor bolts is misaligned in the bolt circle shown in FIG. 4. A pair of the angular gussets 42, 43 is disposed at each corner 40. One of the gussets 42, 43 is located on each side of anchor bolt aperture 40. Angular gussets 42, 43 extend from the upper surface 44 of base flange 22 to the top 38 of collar 20.

Base flange 22 includes four arcuate recesses 46 extending from a point adjacent one anchor bolt aperture 40 to a point adjacent another anchor bolt aperture 40. A horizontally tapped bore 48 is provided at each corner 26, 27, 28, 29 of base flange 22 and extends from the exterior edge of flange 22 to anchor bolt aperture 40. A machine screw (not shown) is threaded into bore 48 to hold a nut cover (not shown) which covers the nut and the free end of anchor bolt 30 upon assembly.

Referring now to FIGS. 7 and 8, grooves 50, 51, 52, 53 are provided at each corner 26, 27, 28, 29 respectively of base flange 22. Each groove includes a base 54 and two sides 56, 58 forming a generally U-shaped footprint shown in FIG. 7. The cross-section of the groove resembles an inverted "U" as shown in FIG. 8. The longitudinal axis of anchor bolt aperture 40 bisects the base side 54. The axis of sides 56, 58 forms an interior obtuse angle of approximately 115° with the axis of base 54. Base 54 of groove 51 is located an equal distance between the base of collar 20 and aperture 40. Each corner 26, 27, 28, 29 includes a reduced, arcuate periphery 62. Groove sides 56, 58 extend from the terminal ends of base 54 toward the ends of arcuate periphery 62 at each corner. The base flange 22 has a full thickness at 64 between the ends of sides 56, 58 and arcuate periphery 62. Groove 51, full thickness portion 64 and arcuate periphery 62 delineates a corner ear 66 which is ultimately sheared away from the base flange 22 upon breakaway as hereinafter described. Groove 51 is cut into the bottom side 68 of base flange 22. The base 52 of groove 51 is located underneath base flange 22 between anchor bolt aperture 40 and the bottom 68 of collar 20. Sides 56, 58 of groove 50 are disposed underneath base flange 22 between one side of anchor bolt aperture 40 and one of the angular gussets 42, 43 located at corner 26. Thus, a groove is located in each corner 26, 27, 28, 29 around anchor bolt aperture 40 and follows a path underneath and adjacent to the pair of angular gussets 42, 43 and collar 20 such that grooves 50, 51, 52, 53 are located inside gussets 42, 43 and collar 20.

The size and depth of grooves 50, 51, 52, 53 is dependent upon the thickness 70 of base flange 22. The holddown forces applied by anchor bolts 30 to base flange 22 are not critical to the present invention.

Referring now to FIG. 9, there is shown an alternative groove 72 having wings 74, 76 at the terminal ends of sides 78, 80. Wings 74, 76 are provided for grooves 72 where base 20 is used for an 8" diameter aluminum standard 12. Wings 74, 76 assist in initiating the tearing and shearing of the corner ears 66 around anchor bolt apertures 40.

In operation, upon an automobile impacting aluminum standard 12, standard 12 crinkles, creases, and bends at the point of impact. Most often this point of impact is approximately 18" above the foundation 32. As the standard 12 crinkles and creases, forces are exerted on the anchor bolts 30 and their washers. The base flange 22 fractures at grooves 50, 53 allowing the heel 84 of base flange 22 to lift away from foundation 32. For example, an arbitrary point of impact shown by arrow 82 in FIGS. 2, and 5 will cause heel 84 of base flange 22 adjacent the point of impact 82 to lift, pivoting on opposite non-impact side 86. This lifting motion of heel 84 causes the base flange 22 to shear, and tear at grooves 50, 51 underneath corners 26, 29. After the corners 26, 29 shear at grooves 50, 51, the corner ears 66 of base flange 22 around aperture 40 remain bolted to foundation 32. Ultimately, the opposite corners 27, 28 also sever from the remainder of base flange 22 as base flange 22 pivots further at non-impact side 86. After severing, the corner ears 66 remain at the four corners 26, 27, 28, 29 of base flange 22 around anchor bolt apertures 36.

The crease of the standard 12 is required to provide the lifting motion on the base flange 22 to cause the corner ears 66 to tear away from base flange 22. Therefore, the metal of standard 12 has been selected to insure that standard 12 has crush characteristics such that standard 12 will crease, crinkle and bend upon impact. The preferred metal is wrought aluminum made of 6063-T6 aluminum alloy. This metal has been determined to have the crush characteristics preferred for the present invention. The present invention will not perform properly if the standard 12 remains rigid and does not bend or crease upon impact.

Aluminum standard 12 is also sized to have a preferred diameter and wall thickness so as to provide the preferred crush characteristics of the present invention. An aluminum standard 12 having a 7" diameter with a wall thickness equal to or less than 0.188" and an aluminum standard 12 having a diameter of 8" with a wall thickness equal to or less than 0.156" have the proper characteristics.

Figure 10:
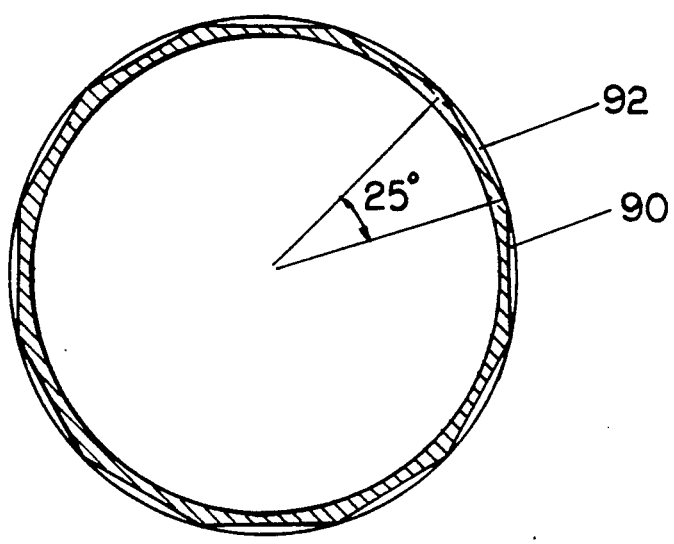
FIG. 10 is a cross-section of the highway lighting standard of FIG. 1 at line 10—10.

Referring now to FIGS. 1 and 10, it has been determined that for standards having a diameter of 8" and a wall thickness greater than 0.156", the crushability of the standard 12 at the point of impact may be enhanced by utilizing vertical metal slab reductions 90. A plurality of vertical metal slab reductions 90, preferably twelve and approximately 18" long, are circumferentially spaced around the external surface of standard 12 and extend from approximately 6" to 24" above the foundation 32, i.e. the anticipated location where a majority of the anticipated creases in the standard 12 will take place. Although twelve reductions 90 on 30 degree centers are preferred, a smaller number, such as eight reductions, may be used depending upon the diameter and wall thickness of standard 12 As shown in FIG. 10, the chord segment 92 represents the metal shaved or removed from standard 12 to form vertical metal slab reduction 90. Chord segment 92, in the preferred embodiment, is a 25 degree central angle measured at the center of standard 12. This central angle for an eight-inch diameter standard 12 reduces the wall thickness by about one-half at the thinnest point of the wall (center of chord segment 92). The standard 12, with these reductions, still maintains sufficient static strength required for bending. Vertical metal slab reductions 90 permit a standard 12 having a diameter of 8" with a wall thickness of 0.188" to crease satisfactorily and meet the required deceleration requirements.

While a preferred embodiment of the present invention has been shown and described, modifications thereof can be made by one skill in the art without departing from the spirit of the invention. For example, grooves 50, 51, 52, and 53 may be circular rather than U-shaped such that the groove circumscribes each anchor bolt aperture 40. Also grooves 50, 51, 52, and 53 may be located on top of the flange 22.

I claim:

1. A breakaway apparatus for anchoring a standard to a foundation comprising:
   a base having support means for supporting the standard, a plate for anchoring to the foundation, and a plurality of pairs of angular gussets, each pair having first and second angular gussets extending from said plate to said support means;
   a connection point disposed in said plate between said first and second angular gussets of each of said pairs for connecting said plate to the foundation;
   said plate having a reduced thickness in an area located between said connection point and said first angular gusset, in an area located between said connection point and said second angular gusset, and in an area located between said connection point and said support means, said areas not extending to a periphery of said plate;
   said reduced thicknesses weakening said plate adjacent each said connection point whereby upon a bending moment being applied to the standard and thus said base, said plate shears at said reduced thickness allowing said support means to breakaway from said foundation.

2. The breakaway apparatus of claim 1 wherein said reduced thicknesses is less than one-half the thickness of said plate.

3. The breakaway apparatus of claim 1 wherein said connection points are circumferentially spaced around the periphery of said plate.

4. The breakaway apparatus of claim 3 wherein there are four connection points.

5. The breakaway apparatus of claim 1 wherein said reduced thicknesses are is a groove adjacent each said connection point.

6. The breakaway apparatus of claim 5 wherein said groove is located adjacent three sides of each said connection point.

7. The breakaway apparatus of claim 5 wherein footprint of said groove is generally U-shaped having a mid-portion and two sides, said sides forming interior obtuse angles of 115° with said mid-portion.

8. The breakaway apparatus of claim 1 wherein said base is made of cast aluminum.

9. An assembly adapted for severing a connection with a foundation comprising:
   a tubular standard;
   said tubular standard including external reductions of metal at the projected point of impact;
   a base having a collar and a base flange, said collar receiving one end of said standard and being affixed thereto;
   said base flange having a peripheral edge and a plurality of apertures circumferentially spaced therearound;
   a plurality of anchor bolts embedded in the foundation and received in said apertures; and
   said base flange having a U-shaped groove therein adjacent each said aperture, said groove not extending to said peripheral edge, whereby upon an object impacting said standard, said base flange shears at said grooves to sever said base from said anchor bolts.

10. The assembly of claim 9 wherein said standard is made of a metal which creases, crinkles and bends upon impact.

11. The breakaway assembly from a foundation comprising:
    a standard made of a metal having crush characteristics;
    a base having support means for supporting said standard, a plate for anchoring to the foundation, and a plurality of pairs of angular gussets, each pair having first and second angular gussets extending from said plate to said support means;
    a connection point disposed in said plate between said first and second angular gussets of each of said pairs of connecting said plate to the foundation;
    said plate having a reduced thickness in an area located between said connection point and said first angular gusset, in an area located between said connection point and said second annular gusset, and in an area located between said connection point and said support means, said areas not extending to a periphery of said plate;
    said reduced thicknesses weakening said plate adjacent each said connection point whereby upon a bending moment being applied to said standard and thus to said base, said standard creases and bends and said plate shears at said reduced thickness allowing said support means to breakaway from said foundation.

12. The breakaway apparatus of claim 11 wherein said standard is wrought aluminum made of an aluminum alloy.

13. The breakaway apparatus of claim 11 wherein said standard has a seven inch diameter with a wall thickness equal to or less than 0.188 inches.

14. The breakaway apparatus of claim 11 wherein said standard has an eight inch diameter and a wall thickness equal to or less than 0.156 inches.

* * * * *